Figure 1:
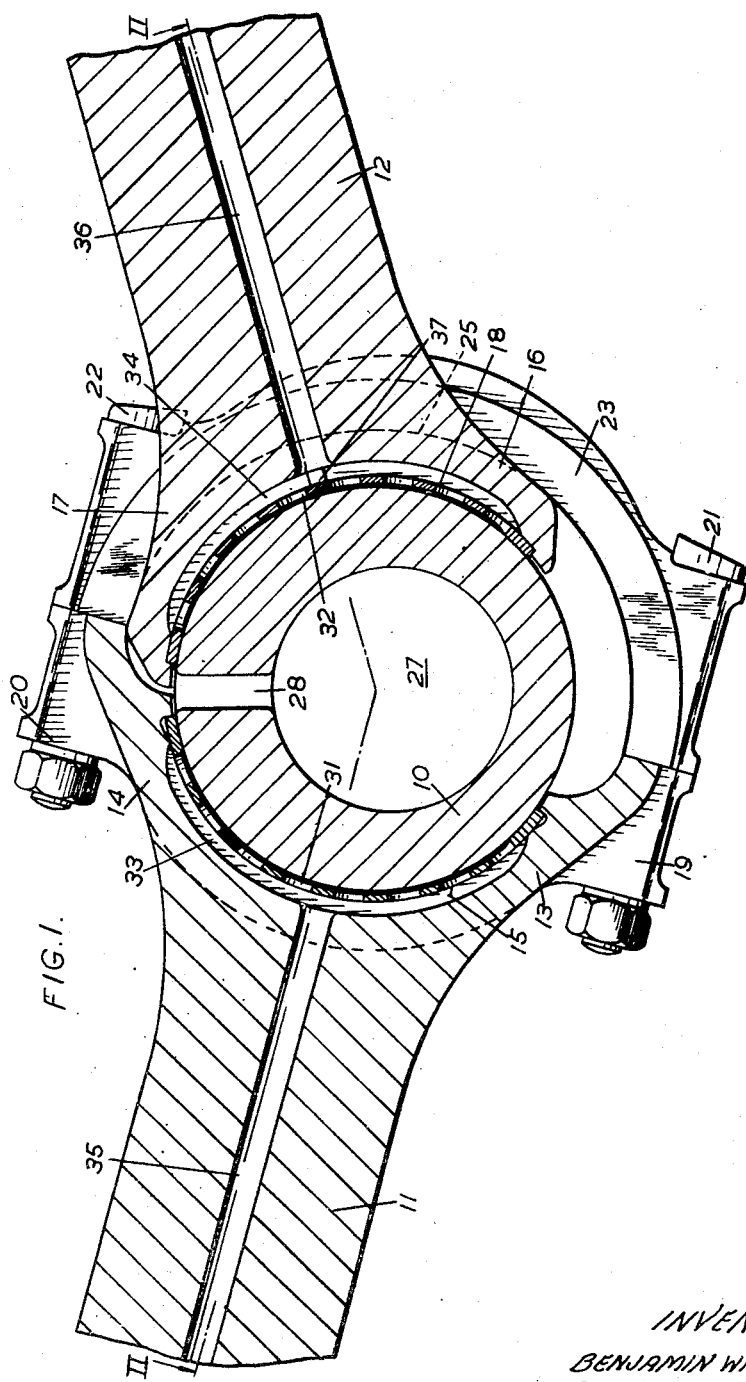

Dec. 1, 1953    B. W. BARLOW ET AL    2,661,253
CONNECTING ROD END BEARING ASSEMBLY
Filed Jan. 13, 1949    2 Sheets-Sheet 1

INVENTORS
BENJAMIN WILLIAM BARLOW
AND ALFRED EDWARD BARNES
BY Emery, Holcombe & Blair
Attorneys Patented Dec. 1, 1953

2,661,253

UNITED STATES PATENT OFFICE 2,661,253

CONNECTING ROD END BEARING ASSEMBLY

Benjamin William Barlow, Wembley, and Alfred Edward Barnes, Greenford, England, assignors to D. Napier & Son Limited, London, England, a company of Great Britain Application January 13, 1949, Serial No. 70,692

Claims priority, application Great Britain January 28, 1948

1 Claim. (Cl. 308—78)

This invention relates to connecting rods for internal combustion engines of the opposed piston type and has for its object to simplify the connection between a pair of connecting rods and a common crank pin on which they act.

A further object of the invention is to provide an improved connecting rod and bearing assembly.

According to the present invention a connecting rod and crank pin assembly for an internal combustion engine of the opposed piston type comprises in combination two connecting rods both bearing on the same circumferential surface of a common crank pin, each rod having a forked end extending over an arc of the crank pin surface which subtends an angle which is less than 180° by an amount at least sufficient to permit the necessary angular movement between the connecting rods about the axis of the crank pin as the crankshaft rotates without the extremities of the forked end of one connecting rod coming into contact with the corresponding extremities of the forked end of the other connecting rod, a concave recess extending in the axial direction right across each of the forked ends, abutments extending in the axial direction at each end of each recess, and a thin walled curved strip of bearing metal in each of said recesses, said strips being so dimensioned as to constitute a force fit between said abutments.

The invention is more particularly, although not exclusively, applicable to supercharged internal combustion engines working on the two-stroke cycle in which in normal running there is at all times a gas pressure on the piston tending to maintain the bearing surfaces of the connecting rods in contact with the common crank pin, but even in such engines this condition will not necessarily always be fulfilled, for instance when the engine is being motored to start it, or at high engine speeds when comparatively large forces are necessary to decelerate the pistons at the end of their outstrokes. To provide for the occasions when the gas pressure alone is insufficient to maintain the connecting rods in contact with the crank pin, therefore, a capping piece is conveniently provided which is connected to the arms of the forked end of one connecting rod and which embraces an external arcuate bearing surface on the forked end of the other connecting rod so as to hold both connecting rods in contact with the crank pin while permitting relative angular movement between them about the axis of the crank pin.

Figure 2:
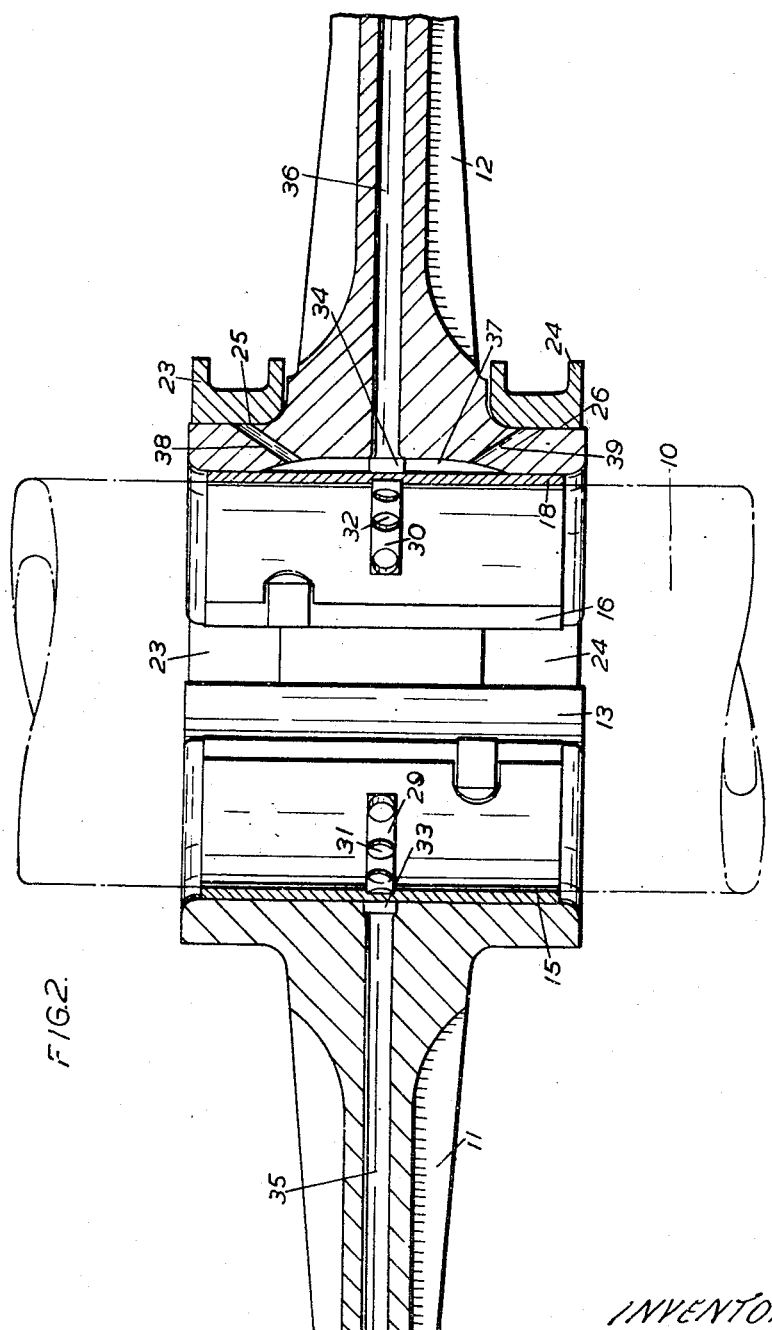

The invention may be carried into practice in various ways but one particular construction of connecting rod and crank pin assembly for a supercharged two-stroke compression ignition internal combustion engine of the opposed piston type will be described by way of example with reference to the accompanying drawings, in which:

Figure 1 is a section of a crank pin and the adjacent parts of the connecting rods which engage it taken in a plane perpendicular to the axis of the crank pin, and Figure 2 is a section taken on the line II—II of Figure 1.

The connecting rod and crank pin assembly shown in the drawings comprise a hollow crank pin 10 which is engaged on one side by a connecting rod 11, hereinafter termed the left hand connecting rod, and on the other side by a connecting rod 12, hereinafter termed the right hand connecting rod.

The left hand connecting rod 11 has a forked end comprising two arms 13 and 14 between which is a thin walled arcuate bearing strip 15. The right hand connecting rod 12 is provided with a forked end comprising two arms 16 and 17 and an arcuate bearing strip 18. The bearing strips 15 and 18 are a press fit in corresponding recesses in the ends of the connecting rods, as described and claimed in United States patent application of Henry C. Tryon, Serial No. 70,691, filed January 13, 1949, now Patent No. 2,639,955, dated May 26, 1953.

The bearing strips 15 and 18 each subtend an angle of rather less than 140° while the extremities of the forked ends of the connecting rods each subtend an angle of rather less than 150°. It will be seen from the drawing that relative angular movement of the connecting rods about the axis of the crank pin can take place through an angle of a little more than 60° without danger of the extremities of the arms 13 and 14 of the left hand connecting rod 11 coming into contact with the extremities of the arms 16 and 17 respectively of the right hand connecting rod 12.

In order to ensure that the connecting rods 11 and 12 remain in contact with the crank pin 10, the left hand connecting rod 11 is provided at each side with a pair of bosses 19 and 20 through which pass bolts 21 and 22 which hold in place a pair of capping pieces 23 and 24. These capping pieces each embrace an external arcuate bearing surface 25 or 26 on the forked end of the right hand connecting rod 12 so as to hold both connecting rods 11 and 12 in contact with the crank pin 10 while permitting relative angular movement between them about the axis of the crank pin. The bearing surfaces 25, 26 or the corresponding surfaces of the capping pieces may or may not be provided, either by deposition or otherwise, with a coating of a bearing metal that is to say a metal selected for its suitability as a bearing metal when used in conjunction with the metal of the connecting rods.

Lubrication of the connecting rod and crank pin assembly is effected as follows. Oil under pressure is pumped into the hollow core 27 of the crank pin 10 and out through a passage 28. As the crank pin rotates oil passes from the passage 28 into grooves 29 and 30 in the bearing strips 15 and 18 and lubricates the contact surfaces of the crank pin and bearings. Some of the oil passes out through oil holes 31 and 32 into arcuate oil ways 33 and 34 in the forked ends of the connecting rods 11 and 12 respectively. Bores 35 and 36 passing up the centres of the connecting rods communicate with these oil ways and permit the oil to pass to the pistons. The capping pieces 23 and 24 and the arcuate bearing surfaces 25 and 26 which they engage are lubricated through an axial extension 37 from the oil way 34 of the right hand connecting rod 12 and through passages 38 and 39 which pass from this extension through the forked end of the connecting rod 12 to the annular bearing surfaces 25 and 26.

It will be appreciated that the various angles subtended by the parts of the connecting rod and crank pin assembly which have been specified above are given by way of example only, and will in fact be determined by the design details of the engine, for instance the length of the stroke, the crank throw and the length of each connecting rod.

What we claim as our invention and desire to secure by Letters Patent is:

A connecting rod end bearing assembly for a crank pin bearing providing a circumferential bearing surface of less than 180° of the type utilizing a thin antifriction liner, said assembly comprising a forked connecting rod end having a concave end face or liner recess extending in the axial direction and adapted to be concentric with the crank pin axis when assembled thereon, abutments extending in the axial direction at each circumferential end of said recess, said abutments being spaced less than 180° apart, a circumferential oil groove in said concave end face extending nearly from one abutment to the other, and a thin walled curved strip of bearing metal in said recess with a row of perforations adapted to pass lubricant in register with said groove and its ends in contact with the inner faces of said abutments, the contacting ends of said strips and abutments being substantially radial and engaged by force fit to retain said strip in said recess.

BENJAMIN WILLIAM BARLOW.
ALFRED EDWARD BARNES.

References Cited in the file of this patent

UNITED STATES PATENTS

| Number | Name | Date |
| --- | --- | --- |
| 693,782 | Buffum | Feb. 18, 1902 |
| 736,458 | Sturtevant | Aug. 18, 1903 |
| 840,190 | Anderson | Jan. 1, 1907 |
| 1,036,337 | Redrup | Aug. 20, 1912 |
| 1,121,904 | Doehler | Dec. 22, 1914 |
| 1,756,095 | Nuenfelt | Apr. 29, 1930 |
| 1,789,714 | Short | Jan. 20, 1931 |
| 1,948,176 | Hopkins et al. | Feb. 20, 1934 |
| 2,343,055 | Halford | Feb. 29, 1944 |

FOREIGN PATENTS

| Number | Country | Date |
| --- | --- | --- |
| 533,564 | Great Britain | Feb. 17, 1941 |
| 368,415 | Italy | Feb. 15, 1939 |